(12) United States Patent
Lacey et al.

(10) Patent No.: US 9,330,725 B2
(45) Date of Patent: *May 3, 2016

(54) SYSTEM AND METHOD FOR USING STAINLESS STEEL AS A DATA ARCHIVING MEDIUM

(71) Applicants: Steven Michael Lacey, Dover, DE (US); John Currie, West Chester, PA (US); Gregory Pine, Hermitage, TN (US); Noureddine Melikechi, Dover, DE (US)

(72) Inventors: Steven Michael Lacey, Dover, DE (US); John Currie, West Chester, PA (US); Gregory Pine, Hermitage, TN (US); Noureddine Melikechi, Dover, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 14/488,828

(22) Filed: Sep. 17, 2014

(65) Prior Publication Data

US 2015/0078147 A1 Mar. 19, 2015

Related U.S. Application Data

(60) Provisional application No. 61/878,904, filed on Sep. 17, 2013.

(51) Int. Cl.
| | |
|---|---|
| *G11B 7/241* | (2006.01) |
| *G11B 27/34* | (2006.01) |
| *G11B 20/10* | (2006.01) |
| *G11B 7/24009* | (2013.01) |
| *G11B 7/003* | (2006.01) |
| *G11B 7/0045* | (2006.01) |
| *G11B 7/24* | (2013.01) |
| *G11B 7/00* | (2006.01) |

(52) U.S. Cl.
CPC ............ *G11B 27/34* (2013.01); *G11B 7/241* (2013.01); *G11B 7/003* (2013.01); *G11B 7/00451* (2013.01); *G11B 7/24009* (2013.01); *G11B 2007/0003* (2013.01); *G11B 2007/240017* (2013.01); *G11B 2020/10879* (2013.01)

(58) Field of Classification Search
None
See application file for complete search history.

(56) References Cited

U.S. PATENT DOCUMENTS

| | | | | |
|---|---|---|---|---|
| 5,406,534 | A * | 4/1995 | Hisakado et al. | 369/47.14 |
| 6,118,740 | A * | 9/2000 | Jacobowitz et al. | 369/44.38 |
| 2002/0092021 | A1* | 7/2002 | Yap et al. | 725/55 |
| 2006/0114802 | A1* | 6/2006 | Marshall et al. | 369/275.1 |

* cited by examiner

*Primary Examiner* — Brian Butcher
(74) *Attorney, Agent, or Firm* — Barnes & Thornburg LLP; Thomas J. McWilliams; Edward F. Behm, Jr.

(57) ABSTRACT

An apparatus, method, and computer readable medium for writing data on a highly indestructible material is disclosed. A laser may write data on a first side of a highly indestructible material. The data may then be marked as non-rewriteable. The data may also be written on a second side of the highly indestructible material, with the second side being opposite the first side. The highly indestructible material may comprise a stainless steel storage medium.

9 Claims, 8 Drawing Sheets

SYSTEM AND METHOD FOR USING STAINLESS STEEL AS A DATA ARCHIVING MEDIUM

RELATED APPLICATIONS

This application claims the benefit of U.S. Provisional Application Ser. No. 61/878,904, filed Sep. 17, 2013, which is hereby incorporated by reference in its entirety.

FIELD OF THE INVENTION

The instant disclosure relates to data archiving, and, more particularly, using stainless steel as a data archiving medium.

BACKGROUND OF THE INVENTION

Data archiving, as defined by a leading storage consulting company, Horison Strategies, is "a set of processes, activities and management of digital data over time to ensure its long term accessibility and security." Archived data may be made up of information that is not changing and rarely needs to be accessed. As such, archived data may need to be "stored and ignored"—in many cases forever.

There are several continuing trends that may raise concerns for the management of archives in the near future including a continuing data explosion, the shelf life of magnetic tape, and the painful process of migrating archives. With respect to the continuing data explosion, according to the IDC's Digital Universe Study of June, 2011, the world's digital data is more than doubling every two years with approximately 1.8 zettabytes to be created, copied or replicated in 2011 and projected up to 7.9 zettabytes (1×1021) in 2015.

Next, with respect to the commonly used magnetic tape storage medium, the actual "useful life" of the magnetic tape is much shorter than its "shelf life", which may impact the cost of ownership. For example, research cites that the 30-year shelf life is rarely used as a migration timeframe, and the Useful Life metric of 10 years is a consistent average and factors into migration cycles.

Lastly, the process of migrating archives is painful, even with advances in software automation tools. Furthermore, taking into consideration the above discussed trends, migration difficulties may increase faster than automation tool advancements.

Magnetic tape has long been the dominant media for archived digital data, providing optimal features and benefits in price, performance, and media longevity. However, it would be advantageous to employ another medium that can go much further to meet the "forever" requirement, and would minimize any archival costs for being inactive—including cyclical migration to new technologies, special vault environmental conditions, and zero ongoing energy costs.

Accordingly, embodiments of the present disclosure are directed to techniques of using stainless steel roll-film as an archiving medium.

SUMMARY OF THE INVENTION

An apparatus, method, and computer readable medium for writing data on a highly indestructible material is disclosed. A laser may write data on a first side of a highly indestructible material. The data may then be marked as non-rewriteable. The data may also be written on a second side of the highly indestructible material, with the second side being opposite the first side. The highly indestructible material may comprise a stainless steel storage medium.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts.

DETAILED DESCRIPTION OF THE PREFERRED EMBODIMENTS

Figure 1:
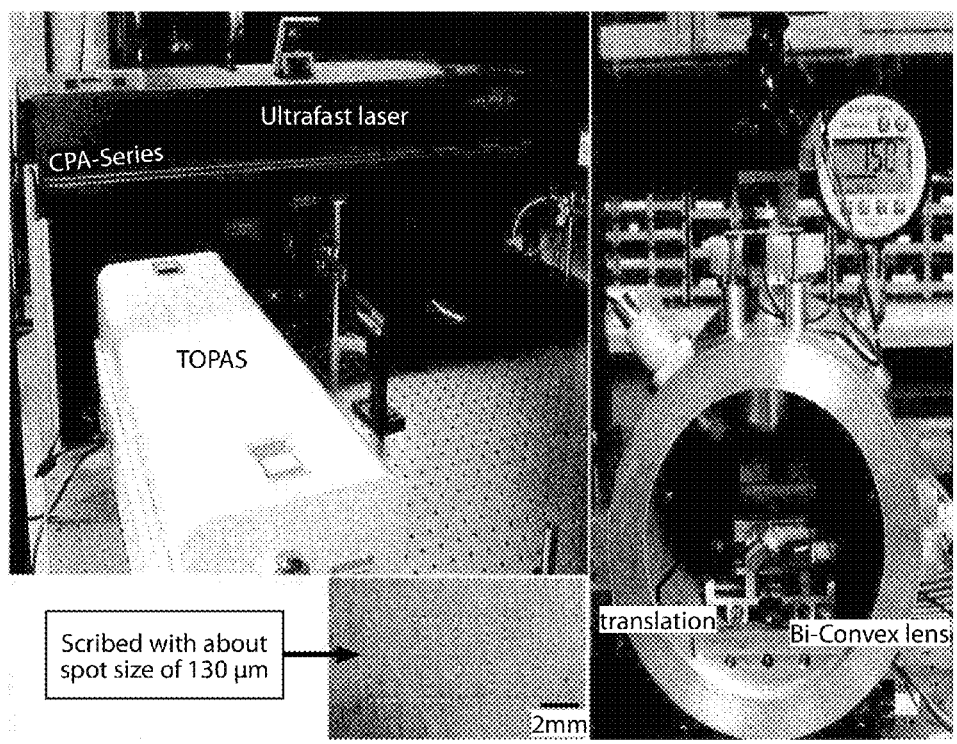
FIG. 1 illustrates an example of a femto-second laser according to embodiments of the present disclosure.

It is to be understood that the figures and descriptions of the present invention have been simplified to illustrate elements that are relevant for a clear understanding of the present invention, while eliminating, for the purpose of clarity, many other elements found in typical storage medium and systems. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Embodiments of the present disclosure are directed to techniques for using a stainless steel as an archival storage medium. Stainless steel has extremely favorable survivability characteristics. For example, it is very resistant to corrosion, it requires no special storage environments, it survives fires up to 1,300 degrees C., floods, extreme temperature and humidity variations, and even magnetic pulses.

Tiered Storage Hierarchy

The storage industry has been working from a well understood storage management model for many years, with the goal of aligning data to its appropriate storage device. This model of best storage practices goes by many names—tiered storage hierarchy, hierarchical storage management, data life-cycle management, information lifecycle management. As data/information becomes persistent (or not changing) and not needing to be accessible, it can be moved to lower cost bulk storage tiers and technologies, saving I.T. departments significant dollars.

Just about every published research report and study on storage technology references the use of this Storage Hierarchy model. The Enterprise Strategy Group published a paper describing the 4 tiers of the storage hierarchy and their respective detailed information characteristics:
1. Dynamic Active Online Data—the highest value, constantly changing, most demanding.
2. Persistent Active Online Data—data stops changing, but still needs to be available.
3. Persistent Inactive Data—unchanged data is rarely needed/accessed, also called online archive or bulk data store, can wait minutes to access it.
4. Doomsday Vault—stored offsite/offline and only needed for full disaster recovery.

This widely held framework can be represented by four simpler labels: Online, Backup, Archive, Offline/Offside. "The Petabyte Challenge" Study, published in 2011, highlights that the amount of active data (Tier 1), fits in the range of 15-20% of all data. The storage hierarch is summarized below, with definitions and storage technologies use for each tier.

Cost of Ownership

The primary business driver for managing storage to this model is economics—lower costs savings by moving data down to lower cost storage tiers. The ESG Report referenced above surveyed 492 I.T. executives and the #1 issue by far with all was to lower their operating costs. (No. 2 was to lower their CapX costs). As archives grow with the relentless data explosion, this tiered storage management model is more important than ever. HSM, or Hierarchical Storage Management, is defined by Horison Strategies as a data storage technique which automatically moves data between high-cost and low-cost storage media based on pre-defined policies. Below are published costs of various storage technologies, published in September 2010 by Horison Information Strategies and based on published pricing at that time.

media and lowest cost per GB to store. The archival lifetime of tape for storing data securely and maintaining data integrity is unmatched, with an archival media life of 30 years. Reliability rates (BER) continue to improve with technology advancements, with current specs at 1×10 to 19th.

Disk Drives

Rapid advances in disk storage technology have caused several white papers to be published comparing tape to disk and suggesting that disk could replace tape altogether. Factors cited to support this scenario include: decreasing costs of SATA drives, newly launched SSD drives, improved reliability/bit error rates, increasing read/write speeds, and increasing capacities. Disks have come on strong in recent years to filling the role for Tier 2—backups for disaster recovery.

However, when looking through the lens of "long-term" requirements, significant concerns are raised. The Clipper Group published a study in December 2010 that compared the cost of ownership (COO) of disk to tape over several migration cycles of long-term data storage. The primary conclusion was that the average disk-based archive costs 15 times more than a tape-based solution. Another important finding—Energy Consumption of the disk solution was more than the total COO of the tape solution over a 12-year period.

Optical Disk

Optical Disk was introduced as a long-term solution to very large capacity requirements. Its technology is based on multiple layers, enabling information to be stored in each layer. Traditionally, optical disc has the same concerns highlighted for disks (above) when used as an archival medium. The technology originated with consumer-based entertainment products, but was not able to keeping [sic] up with competitive magnetic storage technology in terms of areal density, capacity per unit, or transfer rates. The lack of automation tools make archive migrations prohibitive due to the amount of time required and difficulty involved. As a result, this technology is not used often in enterprise data centers.

TABLE 1

Cost of Ownership-Pricing Comparisons

| Subsystem Category | Ave. Price ($/GB) Price Range (") | Notes/Comments |
| --- | --- | --- |
| Solid State Disk (DRAM) FC, SCSI | $400/GB $300-500 | Price range based on capacity and high-availability features |
| Flash (SSD/HDD) | $75/GB $50-100 | Price based on single Flash SSD. |
| Enterprise disk (SCSI, FC) | $13.50/GB $7-20 | Includes controller, cache and drives. Add-on storage modules are lower. (No controller or cache.) |
| Midrange disk (SCSI, FC, SAS) | $4.50/GB $1-8 | Includes controller, cache and drives Add-on storage modules are lower. |
| Optical disc library (Blu-laser) SCSI/WORM | n/a $5-20 | Includes drives, media and library. (No longer a data center technology). |
| Economy disk (SATA, JBOD) | n/a <$1-5 | Price range varies widely based on capacity and array configuration. |
| Tape library (mainframe) Integrated Virtual Tape Library w/disk cache buffer | <$.25 (varies by disk buffer size & number of tape drives) | Includes disk buffer, tape drives, media and library & uses 2:1 compression to determine library capacity. |
| Tape library (non-mainframe) | <$.15 | Includes tape drives, media, & library, & uses 2:1 compression to determine library capacity. |

There are various storage technologies used today including magnetic tape, disk drives, optical disk, and optical or laser-based tape. Details of each of these technologies are explained below.

Magnetic Tape

Magnetic tape dominates as the storage industry's preferred archiving technology, due to its convenient removable Optical or Laser-Based Tape This technology is a medium consisting of a long and narrows strip of plastic onto which patterns can be written to and read back. It shares some technologies with cinema film stock and optical discs, but is compatible with neither. IN the 1990s, it was projected that optical tape would be a commonly used, high-capacity, high speed computer data storage format. At least one working system and several prototypes were developed, but as of 2007, none of these technologies is widely used. Three known companies had produced products: Creo (acquired by Kodak), LOTS Technology, Terabank. The primary motivation behind developing this technology was the possibility of far greater storage capacities than either magnetic tape or optical discs. For example, the goal of the LOTS project in 1995 was to "achieve a data-transfer rate of at least 100 megabytes per second (MB/s) to store more than 1 terabyte on the IBM cartridge", as well as an average access time of 10 seconds; at the time, these specifications were significantly superior to magnetic tape at that time. However, capacities and data transfer rates have significantly increased for both disk and tape. The original developers felt that laser tape is more durable than magnetic tape, since it's not vulnerable to magnetic fields and is ready by lasers instead of physical contact with a magnetic head.

As discussed above, archived data may be defined as the set of processes, activities and the management of digital data over time to ensure its long term accessibility and security. It is both the repository and the content, designed to protect and preserve its contents for as long as necessary.

The International Council on Archives points out the different perspectives of "long term" between I.T. executives and archivists: "5-10 years in the IT community and centuries in our archival community". The Horison Strategies Report cites that 65% of all data under management is kept ion archives (Tier 3) or Doomsday Vaults (Tier 4). And 12% of Oracle User Group I.T. executives surveyed need to keep data "forever". By any measure, this volume of data represents an extraordinary number. Compounding this long-term storage need are several additional pain points, also as discussed above, which include the enormous data explosion, the shortened useful life of magnetic tapes, and increasingly complex process of data migration.

According to IDC's Digital Universe Study of June, 2011, the world's digital data is more than doubling every two years with approximately 1.8 zettabytes to be created and copied or replicated in 2011 and projected up to 7.9 zettabytes (1×1021) in 2015. Volume increases of this magnitude significantly impact the time frames with which administrators have to complete backs and archive migrations.

The Oracle Users Group report (2011), based on a survey of 611 data managers, reported these facts regarding the amount of data under management:
  9% of data centers now manage at least a petabyte (1,000 terabytes) of disk-resident data;
  ⅓ reported their data growth was over 25% year-over-year;
  ½ reported their data growth is outpacing storage capacity;
In 2007, the AMPAS Report summed up the motion picture industry's "digital dilemma", highlighting that digital technology was enabling much more data to be captured during film and video production, but little was being done to preserve this content. Hollywood struggles with the fact that each motion picture produced creates 2 petabytes of digital data associated with it. All executives in the entertainment business understand the 'store-and-ignore' model of film libraries may not work well for digital archiving. Significant costs, as well as ongoing infrastructure costs, are required to preserve digital data.

Recent advances in laser speeds and power, called femto second lasers, now enable a writing mechanism that may accomplish data packing densities with great accuracy. For example, the process of ablation using ultra short pulse lasers consists of depositing intense laser energy onto the surface of a target and transferring it into the target material in a short interval of time.

One of the major advantages of this approach is that the fast energy transfer having a high peak intensity—high enough to evaporate the target—has very little thermal loading, and, hence, yields "clean" ablated spots with minimum thermal damage to the surrounding area. For instance, the peak intensity of a femto second laser may reach the order of $TW/cm^2$. The laser ablation has been shown to be of high quality and precision in micro-machining for many materials such as metals, crystals, plastics, ceramics, diamond and wood. Further, it has the capability of drilling in the range from a few microns to a millimeter in diameter.

Exemplary Embodiments

A typical automated femto-second laser ablation setup is shown in FIG. 1. It consists of a Ti: Sapphire based-chirped pulse amplification (CPA-Series) ultra-short laser (Clark-MXR, Inc, Model: 2210), which operates at a center wavelength of 775-nm with an average energy of 1.5 mJ/pulse and a pulsed duration of 150 femtoseconds. The repetition rate of the laser varies from 100 Hz to 1 kHz and an electronic shutter controller is applied to get the desired number of pulsing rate (ranged from 1 Hz to 1 kHz).

The laser beam is focused onto the material using a 50-mm focal length fused silica Bi-Convex lens. Appropriate spot size may be obtained by placing the material above the focal length (a spot size of 130 um was used here). A motorized stage with an x-y translation may be used to write virtually any character or pattern into a material quickly and precisely, which may be controlled by a Labview-based environment. With the current motorized stage, the material may be transferred up to five different locations per second with the precision of location less than 50 um and with a preferred number of laser shots. Moreover, this precision of location may be achieved within a few microns by introducing a highly precise stepper motor. However, an optical process may be developed that will deliver sub (or about) micron size features.

Embodiments of the present disclosure are directed to techniques of using stainless steel roll-film as an archiving medium. Stainless steel does not require any special storage environments, easily handles fluctuating temperatures and humidity, can survive fires and floods, and even electro-magnetic pulses. For example, since such medium will survive nearly any conditions, and will not degrade the environment around it, the disclosed systems and methods may be employed in moving vehicles for data storage (and will survive flood or fire), including in airplane black boxes for data storage, in space, or the like.

Metallurgists widely support 500 years of shelf life in a nominally controlled storage environment for stainless steel. Much accelerated environmental testing has been done on stainless steel, in extremely harsh conditions, to determine what the life expectancy may be. The Chrysler Building in NYC may be perhaps the most visible example of how a basic grade of stainless steel, after 80 years of outside environmental conditions, still looks relatively new.

A study to estimate stainless steel aging was performed by the British Steel Association, with the failure mode being how long it would take to observe 1 mm of pitting. The table below shows the results. The steel grade closest to the roll-film discussed according to embodiments herein is 316.

TABLE 2

| STEEL GRADE\ LOCATION | ESTIMATED TIME TO PENETRATE 1 mm BY STEEL TYPE | | |
|---|---|---|---|
| | 430 Grade | 304 Grade | 316 Grade |
| Marine | N/A | 145 yrs. | 260 yrs. |
| Semi-industrial | 85 yrs. | 135 yrs. | 525 yrs. |
| Rural | 250 yrs. | 770 yrs. | 1,200 yrs. |

Source: British Stainless Steel Assoc., "Durability & Life Expectancy for Stainless Steels in External Environments"

Stainless steel's durability and ability to hold up to extreme variations in temperature and humidity result in lower investments in expensive vaults and ongoing facilities costs. The material has a melting point exceeding 1300 degrees C., and, as such, may survive most fires with little to no damage. Further, any discoloration due to great heat may only be a few angstroms deep, and can be cleaned relatively easily, leaving any etched image intact.

Stainless steel grades with certain levels of chromium have two interesting characteristics. First, because chromium is chemically inert and non-reactive to most base and acid compounds, it is highly corrosion resistant. Second, chromium oxide is essentially transparent, making it an ideal medium on which to record data.

Further, stainless steel corrosion tests have included surviving a 24 hour nitric acid bath, resulting in minimal corrosive stress cracking. Buildings made of exposed, uncoated stainless steel may survive day to day environmental exposure from 25 to 50 years, depending on climate locations. According to the National Association of Corrosion Engineers (NACE), the resistance characteristics have long been tested. These anti-corrosion features translate into little to no damage from water. Chloride ions may be considered an aggressive hazard when assessing lifetime risks for stainless steels. However, unlike other storage media, oxygen (air) may not deteriorate stainless steel. Further, as used herein, compared to other storage media discussed herein, stainless steel is a highly indestructible and permanent material.

The afore-discussed stainless steel storage medium enables double-sided etching. When a pit is created by a pulsed light of a femto second laser, it may not carry propagated energy into the material, leaving a clean precise mark. Varying thicknesses of roll-film may be employed according to embodiments of the present disclosure.

More particularly, for example, the two sides of the steel storage medium may have etched, and thus stored, therein different types of data, which may or may not be related. By way of non-limiting example, a first side of the medium may have stored therein "digital" data that may, for example, be searched by a user, and a second side of the medium may have etched thereon a picture, such as of a document, that is corresponded to the digital data. Thereby, a search for a term may locate the digital data on the first side of the medium responsive to the search, and a viewer may show a user the etched picture on the second side of the medium immediately opposite the digital data on the first side. That is, human-readable data on one side of the medium may be corresponded to computer-readable data on the other side, as is referenced hereinbelow.

The cost of stainless steel in bulk roll form is comparable to polyester-based film in bulk roll-form. Additional cost may be required for finishing (slitting and handling), but this may be offset by an increase in preservation value.

Figure 2A:
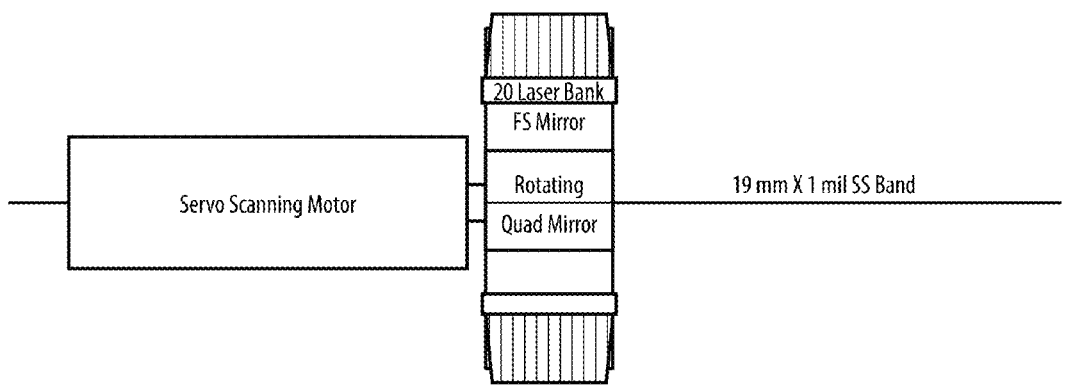
FIG. 2A illustrates a stainless steel band as viewed from the bottom of a scanner according to embodiments of the disclosure.
Figure 2B:
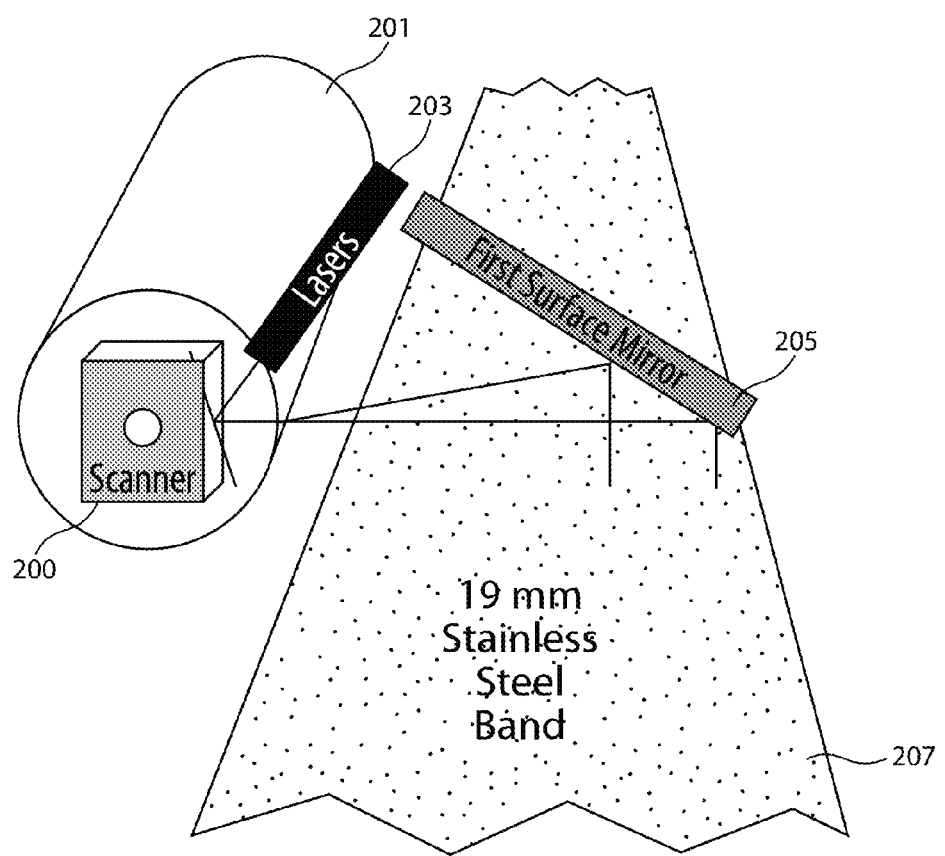
FIG. 2B illustrates an end view of a scanner according to embodiments of the present disclosure.

FIG. 2A illustrates a stainless steel band as viewed from the bottom of a reader/writer according to embodiments of the disclosure. FIG. 2B is an end view of a scanner 200 including a scanning motor 201, read/write laser 203 and four-sided mirror 205, for writing data onto a stainless steel band 207. Although a laser read/write (etch) is shown, those skilled in the pertinent arts will appreciate that other types of etching, such as photo- or chemical etching, may be used. The laser 203 may be used to burn micron-size pits on the band 207 to write data in a permanent form. Specifically, as the stainless steel band 207 travels on a transport mechanism, the band 207 passes the read/write laser 203. Attached to the scanning motor 201, the four-sided mirror 205 passes the laser light to the steel band 207 via an angled mirror. As the laser writes, the steel is formatted and marked as used so rewriting of data may not be possible. Because the data is etched into steel, the writing condition is permanent and highly secure.

The data written on the steel band may be organized into packets, blocks, and directories. Packets may be written with a redundant pattern to assure readability. Blocks may be written within physical boundaries so as to allow faster access to packets. Time code tracks may be redundant to assure proper positioning for rapid block access. Directories may be written in redundant places to insure reliable location of the data.

Figure 3:
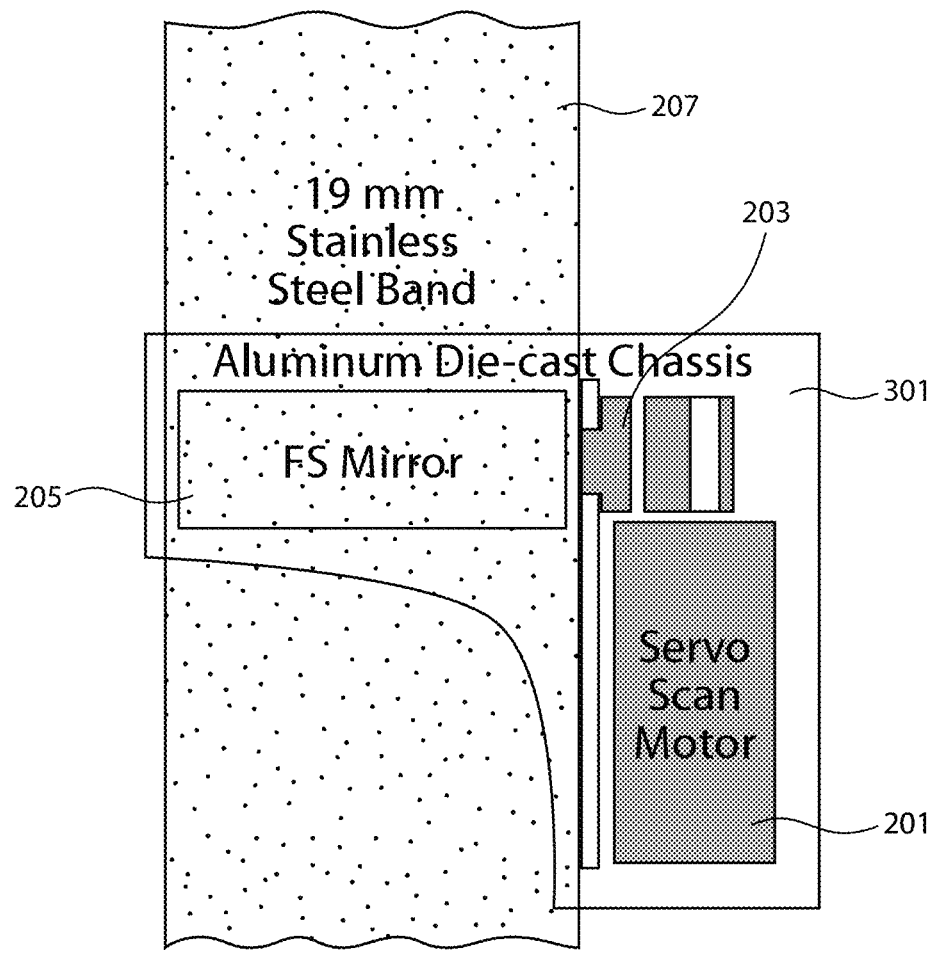
FIG. 3 illustrates a top view of a scanner according to embodiments of the present disclosure.

FIG. 3 is a top view of the scanner including the scanning motor 201, read/write laser 203 and four-sided mirror 205, for writing data onto a stainless steel band 207. The data may be written in a parallel array to speed the read/write process. A scanning drum may be servo-controlled to the band movement using time code data as a master clock. The resulting transport may be simplistic in the form that one or more motors may control the spooling and scanning. A die-cast block 301 (e.g., chassis) may hold all the above-discussed components in alignment, and thus allowing the chassis to flex without risking any destruction of optical integrity.

Embodiments of the present disclosure may write the data two or more times. As the laser scans, the data may be written in a least significant bit ("LSB") to most significant bit ("MSB") order. Then, in the next block, the same data may be written in the reverse order (i.e., MSB to LSB). In a rare event of edge damage, the data near an edge may be duplicated with data from an opposite side of the band. The longitudinal time code tracks may be written on both sides (left and right) of the band. Embodiments of the present disclosure may be configured to be able to write on both top and bottom sides of the band, simultaneously. It is of note that the aforementioned embodiments may offer a data/data product and a data/analogue product. The analogue image may be human readable in a reader similar to a microfilm optically-based reader.

Figure 4:
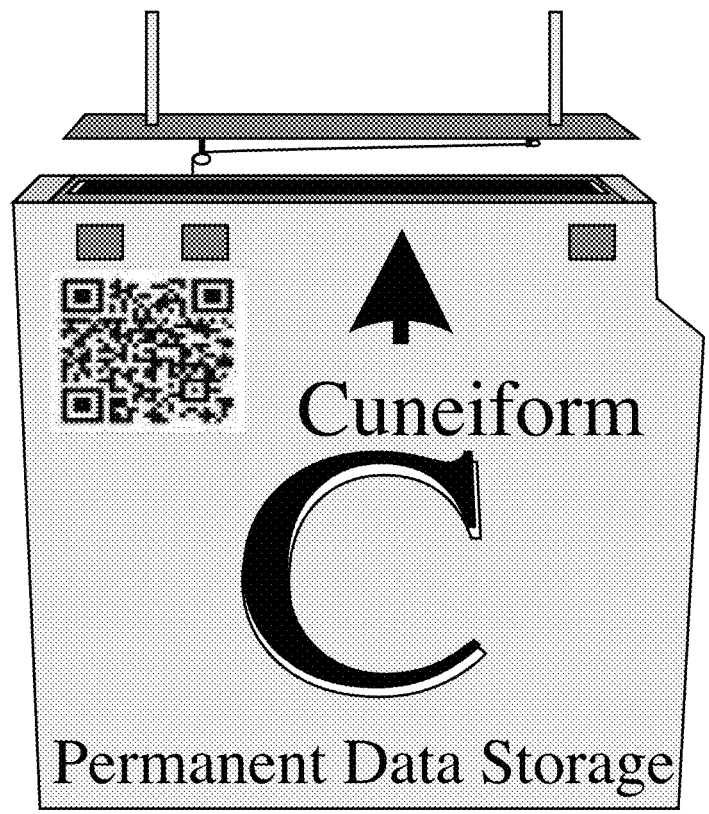
FIG. 4 illustrates an example cassette/transport mechanism according to embodiments of the present disclosure.

FIG. 4 is an example illustration of a cassette/transport mechanism 400 for the stainless steel band. It is contemplated that this cassette may conform to current industry magnetic tape standards. For example, the thin nature of the steel roll film may result in the cassette resembling that of a magnetic tape cassette. Also, the weight of the steel band may be only nominally heavier than magnetic tape, depending on the selected tape width. Embodiments of the present disclosure employ a technique to minimize the time it takes to search for a given location on the steel band. More specifically, the steel medium may be loaded into the cassette and spooled to a desired directory near the medium end. The directory may be read to a host to await instruction to travel to a particular block for data read. If no instruction is received after a predetermined period of time (e.g., 1.5 seconds), the cassette may speed the media to a directory in the middle of the total length of the steel medium.

In another effort to minimize search time, and so as to insure industry standard data speeds, data may be read by the scanning lasers in either direction on the band. When writing is desired, the directory may give a starting and ending position. Read verification may indicate available steel to write upon. After writing, the directories may be updated with new positioning data.

When the cassette is to be ejected, the steel band may be wound into the cassette with two or more layers of blank band covering a first data/directory, which aids to insure protection from environmental pollutants. The cassette may be equipped with packing aids to guide the transport of the steel band and maintain alignment, with minimal friction to eliminate any risk of edge damage.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium, and preferably on a non-transitory computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 5:
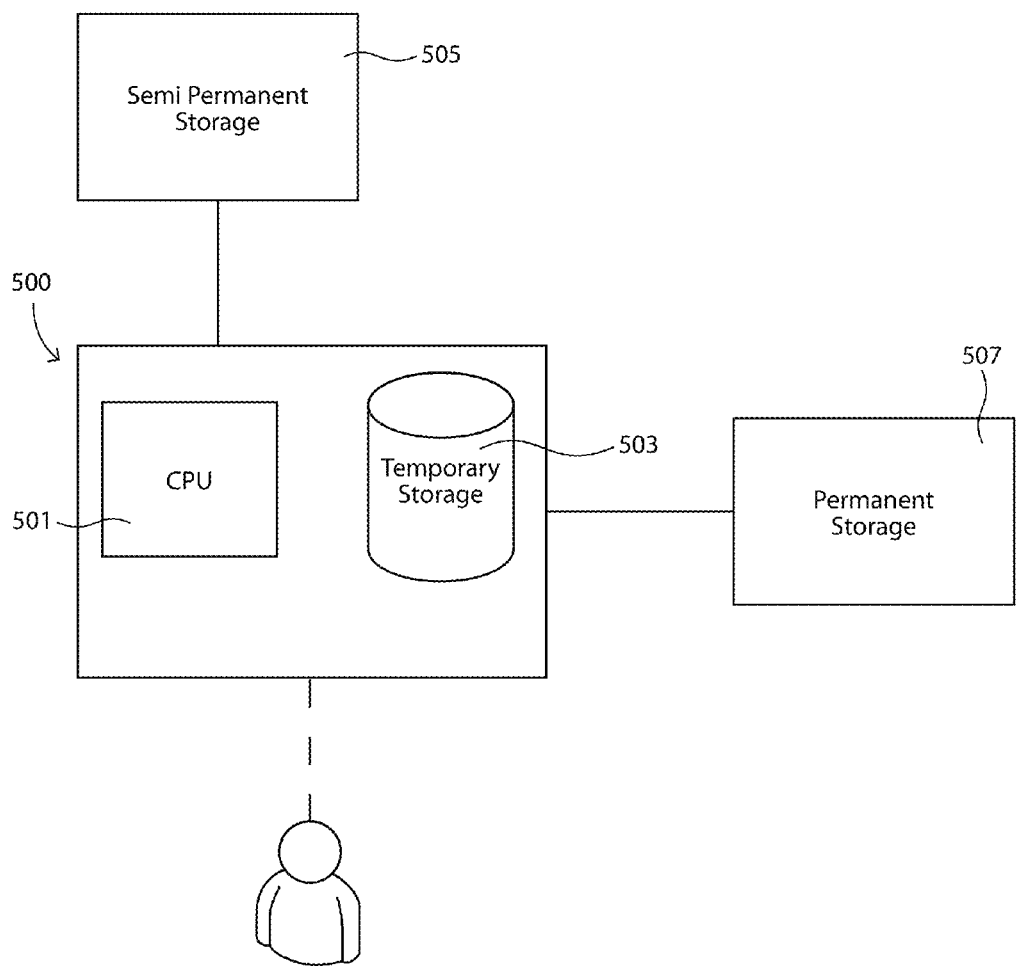
FIG. 5 illustrates a block diagram of an exemplary computing system according to embodiments of the present disclosure.

In accordance with the foregoing, FIG. 5 is a block diagram of an exemplary computing system 500 for use in accordance with herein described systems and methods. Among other things, the computer system comprises a central processing unit ("CPU") 501 and temporary, or non-permanent, storage 503. The system 500 may be communicatively connected to a semi-permanent storage 505 and permanent storage 507. It is appreciated that, although exemplary computing system 500 is shown to comprise a single CPU 501, such description is merely illustrative as computing system 500 may comprise a plurality of CPUs. Additionally, computing system 500 may exploit the resources of remote CPUs (not shown), for example, through a communications network or some other data communications means. Further, the computing system may comprise and/or be communicatively connected to additional storage units and mediums such as those discussed herein.

Figure 6:
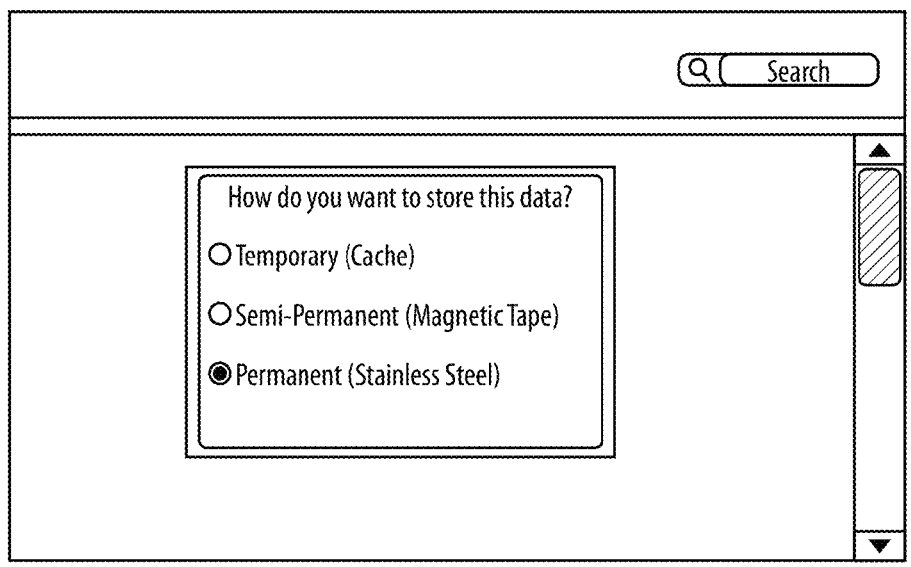
FIG. 6 illustrates an example screen shot providing a user with options for storing data according to embodiments of the present disclosure.

In accordance with the foregoing, the disclosed embodiments may provide techniques, which may be employed on any of the aforementioned devices, for reading and/or writing data onto a stainless steel storage medium. For example, embodiments of the present disclosure may be employed on a computing device by a user wishing to store his or her data. More specifically, as shown in the example screen shot in FIG. 6, for example, on a user interface screen of the user's computing device, the user wishing to store his data may be prompted with options on how and/or what medium on which he desires to store his data. For example, the user may have the option of storing his data in temporary storage (e.g., cache), semi-permanent storage (e.g., magnetic tape, disk drive, optical disk, and the like), and/or permanent storage (e.g., the steel tape/disc read/write system discussed herein-throughout). With respect to the permanent storage option, based on the user's storage needs, he may have the option of employing the afore-discussed techniques of storing his data onto a stainless steel storage medium, which may be particularly advantageous as a long term storage medium, and which may be considered as permanent or more permanent than the other storage options.

Of course, those skilled in the art will appreciate, in light of the disclosure, that other options or questions may be presented by the software of the invention. For example, the user may be asked, "For how long would you like to save this? A) 1 year; B) 5 years; C) 50 years." Likewise, a drop down asking for how long the user wishes to save the data may be provided. Correspondingly, a 1 year save may be executed to the local hard drive, a 5 year save to an attached external drive, and a 50 year save to a local steel medium drive. Likewise, a user could be asked other methodologies of how to save the data, such as how securely or the like.

Additionally and alternatively, a 50 year, or a "permanent," or a "highest security," save may occur to a remote location. For example, a user may execute a permanent save to a remote location, at which a save to the disclosed steel medium is performed. Thereafter, the steel medium may or may not be physically available to/provided to the saving user, and the data saved may or may not be electronically available to the user via an interface. In either case, the user would have peace of mind knowing the data would survive any catastrophic event, rather than depending upon the current art's reliance on redundancy (i.e., "cloud" storage employs redundancy, rather than true permanency, and consequently, if the redundancies fail, such as in a catastrophic event, the data is lost. By way of non-limiting example, the disclosed storage medium is not susceptible to the loss of air conditioning at a data center. As such, permanency of storage may only be ensured by storage on a permanent medium, such as that disclosed herein. In short, the present invention may provide an analog insurance for the inherent non-permanence of typical digital medium.

Of course, the user may be subjected to a variety of pricing models, particularly in the event that the disclosed true permanent storage is provided as a remote service. For example, a user may pay a first fee if the user selects redundant storage, i.e., "cloud" storage, and a second fee may be required to store permanently but remotely, and yet a third fee may be charged to store permanently and to send the permanent medium (or a copy thereof) to the user.

Likewise, the user may pay based on an amount saved. For example, a certain government entity may back up all existing, and newly accumulated, data every 7 years. Obviously, this may take significant dedication of resources and expenditures every 7 years. Accordingly, the present pricing model may be that which the government entity would have spent over its next two saves. And, since only the saving of newly accumulated, rather than all existing, data would be necessary after implementation of the disclosed systems and methods, the provided true permanent steel storage medium would be free to that governmental user after 14 years.

Moreover, such optional storage methodologies may be "white labeled," and as such may be made available by a variety of providers who wish to offer such a service to those wishing to store data with that provider. Yet further, the read/write nature, via, for example, etching, provided by the present invention allows for permanent "backward compatibility" of the data reading and writing capabilities. That is, due to the permanent, physical nature of the storage, any software having the ability to interconnect with a reader/writer for the medium will be able to read the permanently stored data placed on the medium.

Figure 7:
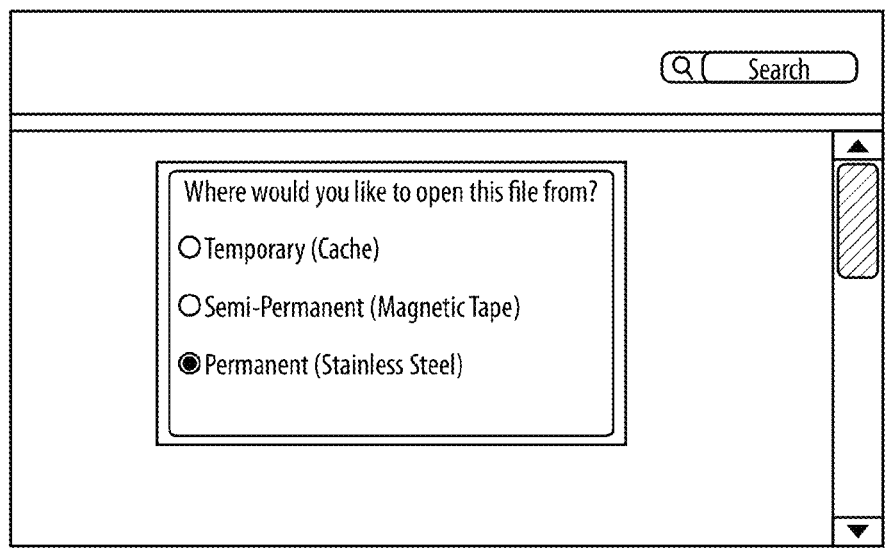
FIG. 7 illustrates an example screen shot providing a user with options for retrieving data according to embodiments of the present disclosure.

Also in accordance with the foregoing, embodiments of the present disclosure may be employed on a computing device by a user wishing to read already stored data. More specifically, as shown in the example screen shot in FIG. 7, for example, on a user interface screen of the user's computing device, the user wishing to read his already stored data may be prompted with options on how and/or what medium from which he desires to read selected files of data. For example, the user may have the option of reading files from temporary storage (e.g., cache), semi-permanent storage (e.g., magnetic tape, disk drive, optical disk, and the like), and/or permanent storage. With respect to the permanent storage option, based on the user's storage needs, he may also have the option of employing the afore-discussed techniques of reading his data from a stainless steel storage medium.

The foregoing embodiments of the present disclosure may be provided in a local ergonomic read/write system that can connect with any residential computing system. These residential computing system include but are not limited to laptops, desktops, tablet, or any of the aforementioned or well-understood computing devices. Connectivity to these residential computing devices include, but are not limited to cable, standard or proprietary connectors, hard docks, reading removable or external physical memory or other wireless methods like WiFi, Bluetooth, RFID, NFC, and the like.

Although the invention has been described and pictured in an exemplary form with a certain degree of particularity, it is understood that the present disclosure of the exemplary form has been made by way of example, and that numerous changes in the details of construction and combination and arrangement of parts and steps may be made without departing from the spirit and scope of the invention as set forth in the claims hereinafter.

The invention claimed is:

1. A method for writing data on a material, the method comprising:
   writing, using a laser, data on a first side of the material;
   marking the data as non-rewriteable;
   writing, using the laser, the data on a second side of the material, wherein the second side is opposite the first side; and
   covering a first directory of the material with two or more layers of blank band in response to ejection of the material;
   wherein the material is highly indestructible material.

2. The method of claim 1, wherein the data is written on the first side and the second side simultaneously.

3. The method of claim 1, wherein the highly indestructible material is stainless steel.

4. A method for writing data on a band, the method comprising:
   writing, using a laser, data on a top side of the band;
   marking the data as non-rewriteable;
   writing, using the laser, the data on a bottom side of the band, wherein the top side is opposite the bottom side; and
   covering a first directory of the stainless steel band with two or more layers of blank band in response to ejection of the stainless steel band;
   wherein the band is a stainless steel band.

5. The method of claim 4, wherein the data is written on the top side and the bottom side simultaneously.

6. The method of claim 4, wherein the data on the band is organized into packets, blocks, and directories.

7. A non-transitory computer readable storage medium having encoded thereon computer executable instructions for a computer-implemented method, comprising:
   presenting a graphical user interface on a screen that provides storage options for storing data, the storage options consist of: temporary storage, semi-permanent storage, and permanent storage;
   storing the data to the selected storage option in response to a user selection;
   writing, using a laser, the data to the permanent storage, the permanent storage comprising two sides, in response to the user selection of permanent storage;
   wherein the writing includes etching on a first side of the two sides digital data that is searchable and etching on a second side of the two sides a picture that corresponds to the digital data;
   covering a first directory of the permanent storage with two or more layers of blank band in response to ejection of the permanent storage; and
   wherein the permanent storage is a stainless steel roll-film.

8. The non-transitory computer readable storage medium of claim 7, wherein the instructions further comprise:
   presenting a graphical user interface on the screen that provides retrieval options for retrieving data, the retrieval options consist of: temporary storage, semi-permanent storage, and permanent storage.

9. The non-transitory computer readable storage medium of claim 7, wherein the laser is an automated femto-second laser ablation setup.

* * * * *